(12) United States Patent  (10) Patent No.: US 7,520,261 B2
Saruwatari et al.  (45) Date of Patent: Apr. 21, 2009

(54) APPARATUS FOR AND METHOD OF CONTROLLING INTAKE OPERATION OF AN INTERNAL COMBUSTION ENGINE

(75) Inventors: Masayuki Saruwatari, Isesaki (JP); Junichi Furuya, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/029,671

(22) Filed: Feb. 12, 2008

(65) Prior Publication Data
US 2008/0210195 A1 Sep. 4, 2008

(30) Foreign Application Priority Data
Feb. 13, 2007 (JP) .............................. 2007-032498

(51) Int. Cl.
*F02B 5/02* (2006.01)
(52) U.S. Cl. .................................. 123/305; 123/90.15
(58) Field of Classification Search ... 123/90.15–90.18, 123/305
See application file for complete search history.

(56) References Cited
U.S. PATENT DOCUMENTS

| 6,055,948 | A | 5/2000 | Shiraishi et al. | |
| 6,394,051 | B1 * | 5/2002 | Filipe et al. | ............... 123/90.15 |
| 6,681,741 | B2 * | 1/2004 | Majima et al. | ............... 123/399 |
| 6,837,040 | B2 * | 1/2005 | Sonoda et al. | ................. 60/284 |
| 7,124,734 | B2 * | 10/2006 | Almkvist et al. | ............ 123/299 |
| 7,296,550 | B2 * | 11/2007 | Trask et al. | ............. 123/179.18 |
| 7,325,521 | B1 * | 2/2008 | Leiby et al. | ............... 123/90.15 |
| 7,373,928 | B2 * | 5/2008 | Thomas | ....................... 123/491 |
| 7,398,749 | B2 * | 7/2008 | Weiss et al. | ............... 123/90.16 |

FOREIGN PATENT DOCUMENTS

JP 2005-140007 A 6/2005
WO WO 97/13063 A1 4/1997

* cited by examiner

*Primary Examiner*—Erick Solis
(74) *Attorney, Agent, or Firm*—Foley & Lardner LLP

(57) ABSTRACT

Opening timing of the intake valve of an internal combustion engine is controlled to take a value within a range from 30° to 140° after the top dead center of intake stroke during a period of time before completion of engine warming-up from starting of an engine, and also, effective opening area of the intake valve is made smaller than the effective opening area thereof that occurs after completion of engine warming-up in order to increase the flow velocity of intake air entering through the intake valve, and at the same time, fuel is injected into a combustion chamber during at least one of a first period of time in which the flow velocity of intake air is high immediately after the intake valve is opened and a second period of time previous to the first period of time in which the flow velocity of intake air is high, and during a third period of time starting immediately before ignition timing.

17 Claims, 13 Drawing Sheets

APPARATUS FOR AND METHOD OF CONTROLLING INTAKE OPERATION OF AN INTERNAL COMBUSTION ENGINE

BACKGROUND OF THE INVENTION

1. Field of the Invention

The present invention relates to an internal combustion engine of the type in which fuel is directly injected into a combustion chamber and both a phase of the center (it will be hereinafter referred to as "center phase" for the simplicity sake) of an operating angle of an intake valve and an effective opening area (i.e., a lift amount) of the intake valve are variably controlled. More particularly, the present invention relates to an apparatus for and a method of controlling an intake operation of an internal combustion engine of the described type.

2. Description of the Related Art

Japanese Laid-open (Kokai) Patent Application Publication No. 2005-140007 discloses such a technical idea that, in a direct-injection type internal combustion engine, the lift amount of an intake valve is controlled to become lower during a period of time from the starting of an engine operation to a time before completion of the engine warming-up, in order to reduce engine friction and to accelerate vaporization of injected fuel by increasing a flow velocity of intake air.

Further, similarly to the above-mentioned technical idea, WO97/13063 discloses an art in which the fuel injection is performed in an intake stroke while controlling a lift amount of an intake valve to become lower, in order to accelerate vaporization of injected fuel by increasing the flow velocity of intake air at the time of starting of the engine.

However, according to Japanese Laid-open (Kokai) Patent Application Publication No. 2005-140007, when characteristics of the direct-injection type internal combustion engine are utilized to perform the warming-up accelerating combustion by which ignition timing and injection timing are retarded until an expansion stroke so that the exhaust gas temperature is increased, since a required air amount is large, the lift amount of the intake valve cannot be controlled to become low, and consequently, an increase in the flow velocity of the intake air cannot be achieved.

Further, as described in WO97/13063, even if the lift amount of the intake valve can be controlled to become low, the intake stroke is completed before a negative pressure fully prevails in a combustion chamber. Therefore, a period of time in which the flow velocity of intake air is high is too short to complete the fuel injection during this short period of time.

SUMMARY OF THE INVENTION

In view of the above problems, an object of the present invention is to improve as much as possible combustion performance and performance of exhaust-gas-purification during a given period of time from the starting of an engine to a time before the completion of the engine warming-up.

In order to achieve the above object, in accordance with the present invention:

a first variable valve mechanism which varies a center phase of an operating angle of an intake valve and a second variable valve mechanism which continuously varies an effective opening area of the intake valve are controlled so that:

opening timing of the intake valve is set at a value within a range from 30° to 140° after the top dead center of intake stroke: and also, the effective opening area of the intake valve is made smaller than the effective opening area thereof after the completion of engine warming-up to thereby increase the flow velocity of intake air from the intake valve; and further, a fuel injection valve which directly injects fuel into a combustion chamber is controlled so that the fuel injection is performed during at least one of a period of time immediately after the intake valve is opened, in which the flow velocity of intake air is high and another period of time previous to the period of time in which the flow velocity of intake air flow is high, and during a further period of time starting immediately before ignition timing.

The other objects and features of this invention will become understood from the following description with reference to the accompanying drawings.

DESCRIPTION OF PREFERRED EMBODIMENTS

Figure 1:
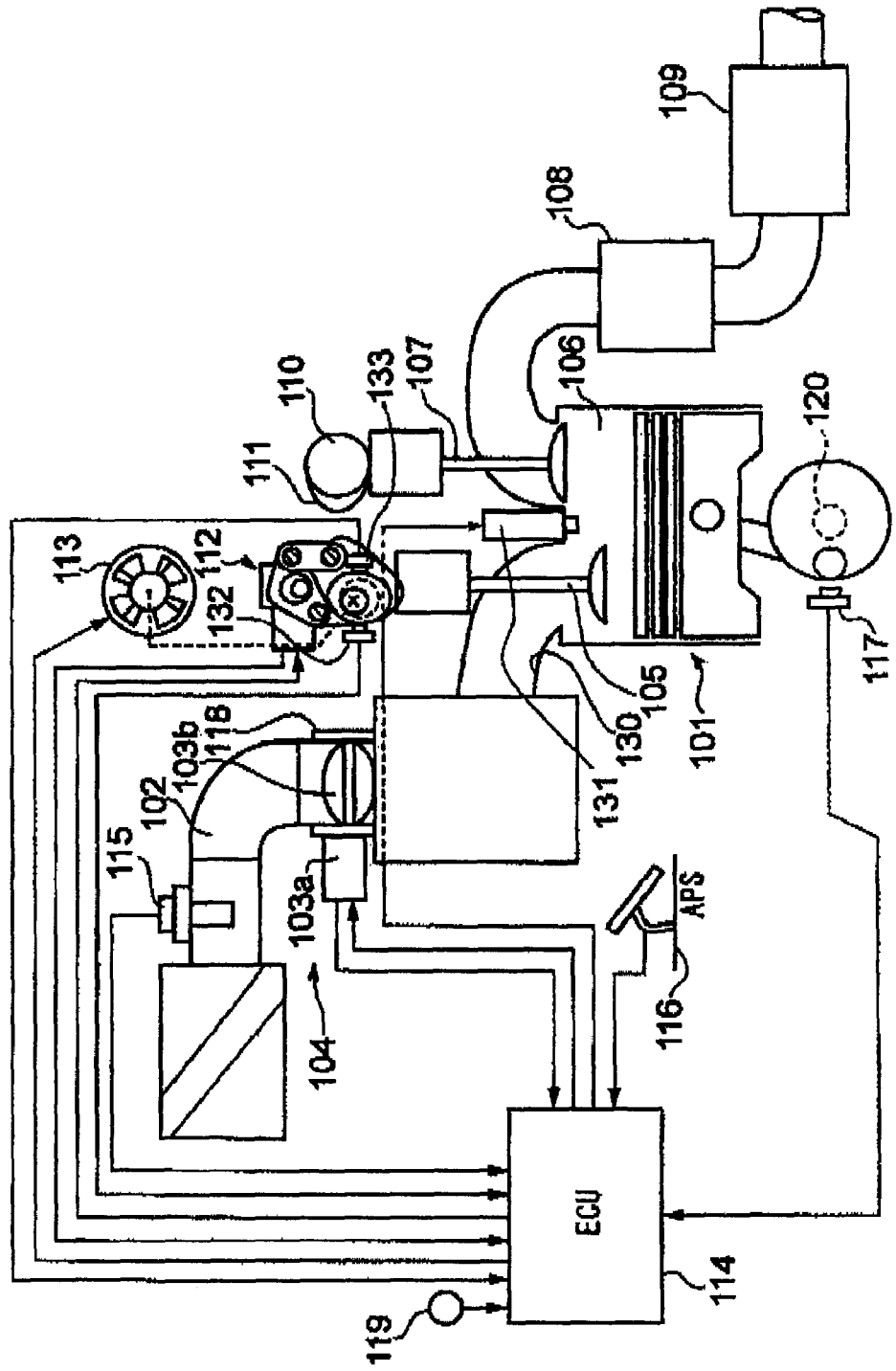
FIG. 1 is a systematic diagram of a vehicular engine according to an embodiment of the present invention.

In FIG. 1, in an intake pipe 102 of an engine (gasoline internal combustion engine) 101, there is disposed an electronically controlled throttle 104 in which opening and closing of a throttle valve 103b is driven by a throttle motor 103a, and the intake air is introduced into a combustion chamber 106 via electronically controlled throttle 104, an intake port 130 and an intake valve 105.

Further, an electromagnetic type fuel injection valve 131 which directly injects fuel into combustion chamber 106 is disposed in each cylinder. Fuel injection valve 131 injects the fuel (gasoline) of which an amount is proportional to injection pulse width of an injection pulse signal outputted from an engine control unit 114.

The fuel injected into combustion chamber 106 is ignited to be combusted by a spark ignition using an ignition plug (not shown in the figure).

The exhaust gas in combustion chamber 106 is discharged via an exhaust valve 107 and thereafter, is purified by a front catalytic converter 108 and a rear catalytic converter 109 to be discharged into the atmosphere.

Exhaust valve 107 is opened or closed by driving of a cam 111 axially supported by an exhaust side camshaft 110 while maintaining a constant lift amount thereof and a constant operating angle thereof (a crank angle from an opened state to a closed state).

Further, on an intake valve 105 side, there is disposed a variable valve lift mechanism 112 which continuously varies a lift amount of intake valve 105 as well as an operating angle thereof, as a first variable valve mechanism. Incidentally, an effective opening area of intake valve 105 can be changed by varying the lift amount thereof and the operating angle thereof. Variable valve lift mechanism 112 may be a mechanism which continuously varies only the lift amount of intake valve 105. A configuration of variable valve lift mechanism 112, which satisfies functions relating to the present invention, may be such that the effective opening area of intake valve 105 during a period of time from the starting of an engine operation to a time before the completion of engine warming-up is controlled to be smaller than the effective opening area of intake valve 105 after the completion of engine warming-up, to thereby fully increase the flow velocity of intake air, and also, variable valve lift mechanism 112 may be a mechanism which switches the effective opening area of intake valve between large and small two-stages.

Also, on the intake valve 105 side, there is disposed on each end portion of an intake side camshaft 3, a variable valve timing mechanism 113 made up by a mechanism which variably controls a rotational phase difference between the crankshaft and the intake side camshaft to retard or advance a center phase of the operating angle of intake valve 105.

Here, opening timing of intake valve 105 and closing timing thereof are varied by varying the center phase of the operating angle of intake valve 105 by variable valve timing mechanism 113 as well as by varying the lift amount (operating angle) of intake valve 105 by variable valve lift mechanism 112.

Engine control unit 114 incorporating therein a microcomputer sets a fuel injection amount, ignition timing, target torque and a target manifold pressure by computation process in accordance with beforehand stored programs, and further, based on these set data of fuel injection amount, ignition timing, target torque and target manifold pressure, outputs control signals to fuel injection valve 131, a power transistor for an ignition coil, electronically controlled throttle 104, variable valve lift mechanism 112 and variable valve timing mechanism 113.

Engine control unit 114 receives detection signals from an air flow meter 115 for detecting an intake air amount of engine 101, an accelerator pedal sensor 116 for detecting a depression amount (accelerator opening) of an accelerator pedal operated by a vehicle driver, a crank angle sensor 117 for outputting a crank angle signal at each of reference rotational positions of a crankshaft 120, a throttle sensor 118 for detecting an opening TVO of throttle valve 103b, a water temperature sensor 119 for detecting the cooling water temperature of engine 101, an intake side cam sensor 132 for outputting a cam signal at each of reference rotational positions of intake side camshaft 3 and the like.

Figure 2:
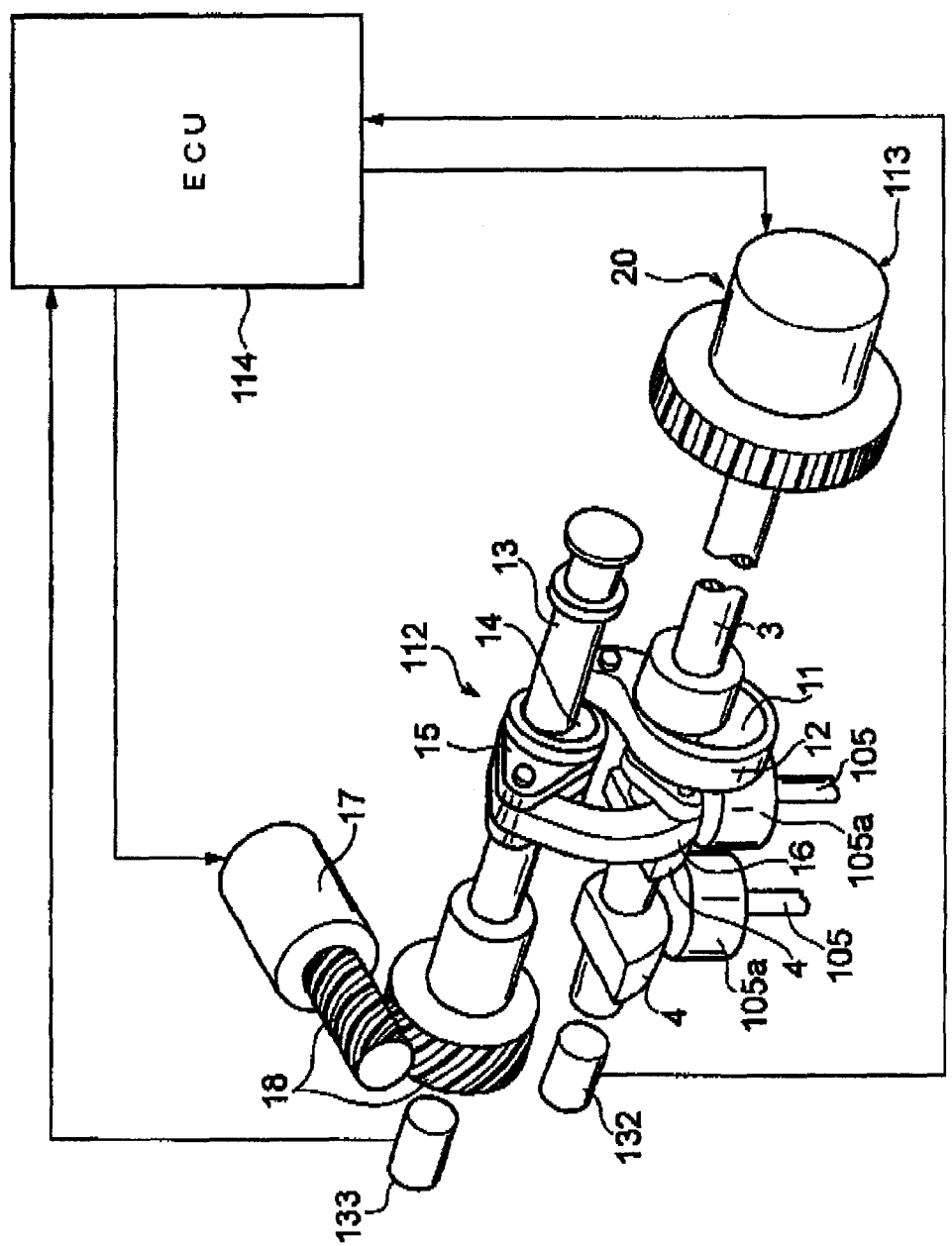
FIG. 2 is a perspective view illustrating a variable valve lift mechanism for an intake valve according to the embodiment of the present invention.

FIG. 2 is a perspective view showing a structure of variable valve lift mechanism 112.

In engine 101, a pair of intake valves 105, 105 is disposed to each cylinder, and above intake valves 105, 105, intake side camshaft 3 which is driven for rotation by crankshaft 120 is rotatably supported to extend in a direction along a cylinder train.

Swing cams 4 each of which is in contact with a valve lifter 105a of each intake valve 105 to drive opening and closing of intake valve 105, are fitted to an outer surface of intake side camshaft 3, so as to be rotatable relative to intake side camshaft 3.

Between intake side camshaft 3 and swing cam 4, variable valve lift mechanism 112 which continuously varies the lift amount (and the operating angle) of intake valve 105, is disposed.

Further, on one end portion of intake side camshaft 3, there is disposed variable valve timing mechanism 113 which changes the rotational phase of intake side camshaft 3 relative to crankshaft 120 to continuously vary the center phase of the operating angle of intake valve 105.

Figure 3:
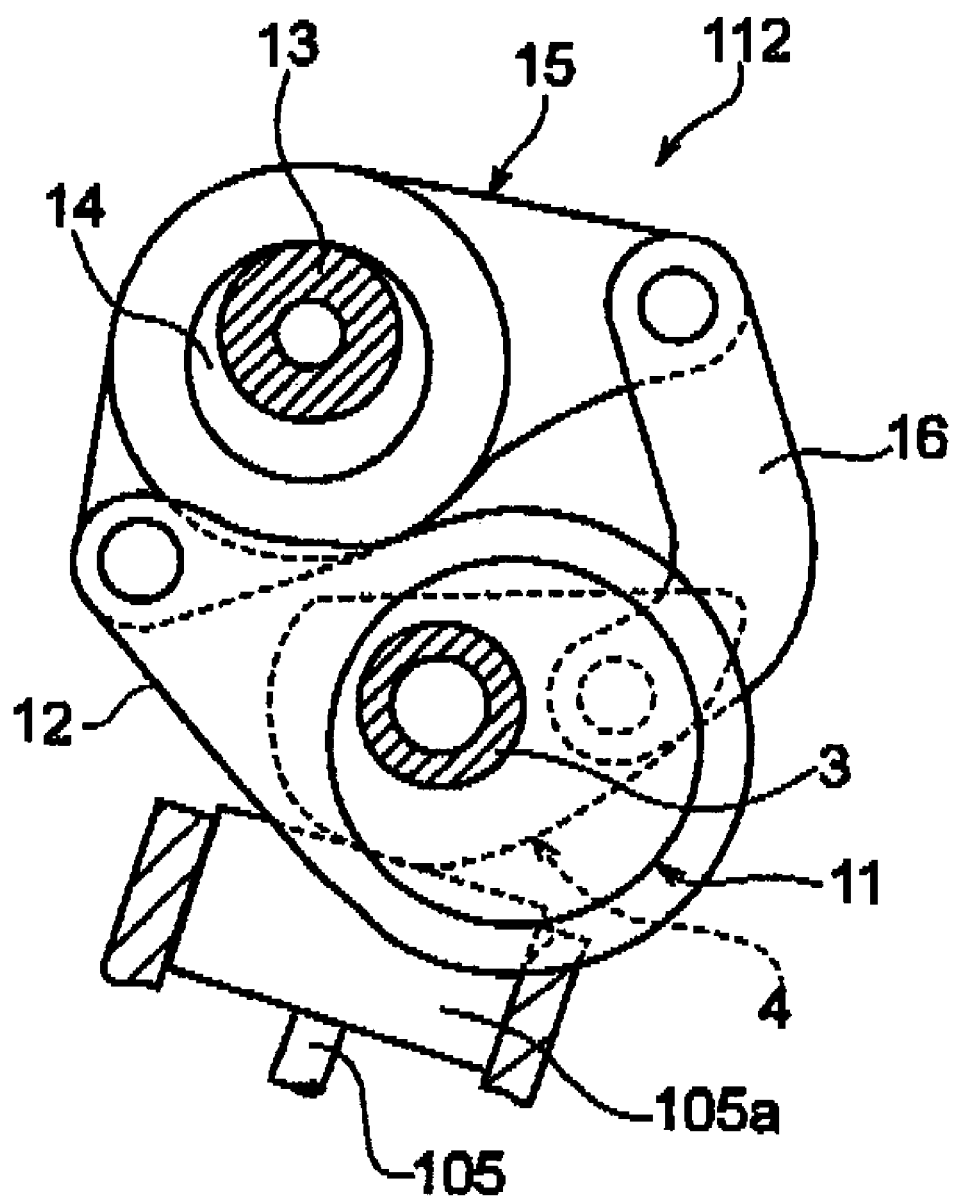
FIG. 3 is a cross-sectional view illustrating a main part of the variable valve lift mechanism.

As shown in FIGS. 2 and 3, variable valve lift mechanism 112 includes: a drive cam 11 of circular shape which is fixedly disposed on intake side camshaft 3 in an eccentric state; a link 12 of ring shape which is fitted to an outer surface of drive cam 11 to be rotatable relative to drive cam 11; a control shaft 13 which extends in a direction of the cylinder train to be in approximately parallel with intake side camshaft 3; a control cam 14 of circular shape which is fixedly disposed on control shaft 13 in an eccentric state; a rocker arm 15 which is fitted to an outer surface of control cam 14 to be rotatable relative to control cam 14, and also, is connected at one end thereof to a tip end of link 12 of ring shape; and a link 16 of rod shape which is connected to the other end of rocker arm 15 and to swing cam 4.

Control shaft 13 is driven for rotation by a motor 17 via a gear train 18 within a predetermined controlled range.

According to the above configuration, when intake side camshaft 3 cooperates with crankshaft 120 to be rotated, ring shaped link 12 performs the approximate translation via drive cam 11 and also, rocker arm 15 swings about the axle center of control cam 14, and further, swing cam 4 swings via rod shaped link 16, so that intake valve 105 is driven to open or close.

Further, by controlling the driving operation of motor 17 so as to change a rotating angle of control shaft 13, a position of the axle center of control cam 14, which is the swing center of rocker arm 15, is changed, so that the orientation of swing cam 4 is changed.

As a result, the operating angle of intake valve 105 and the lift amount thereof are continuously changed, under a condition such that the center phase of the operating angle of intake valve 105 is approximately kept constant.

Engine control unit 114 receives a detection signal from an angle sensor 133 for detecting the rotating angle of control shaft 13, and feedback-controls motor 17 based on a detection result of angle sensor 133 to thereby rotate control shaft 13 to a target angle position corresponding to a target lift amount.

Incidentally, as an actuator for driving to rotate control shaft 13, a hydraulic actuator can be used in place of motor 17.

Figure 4:
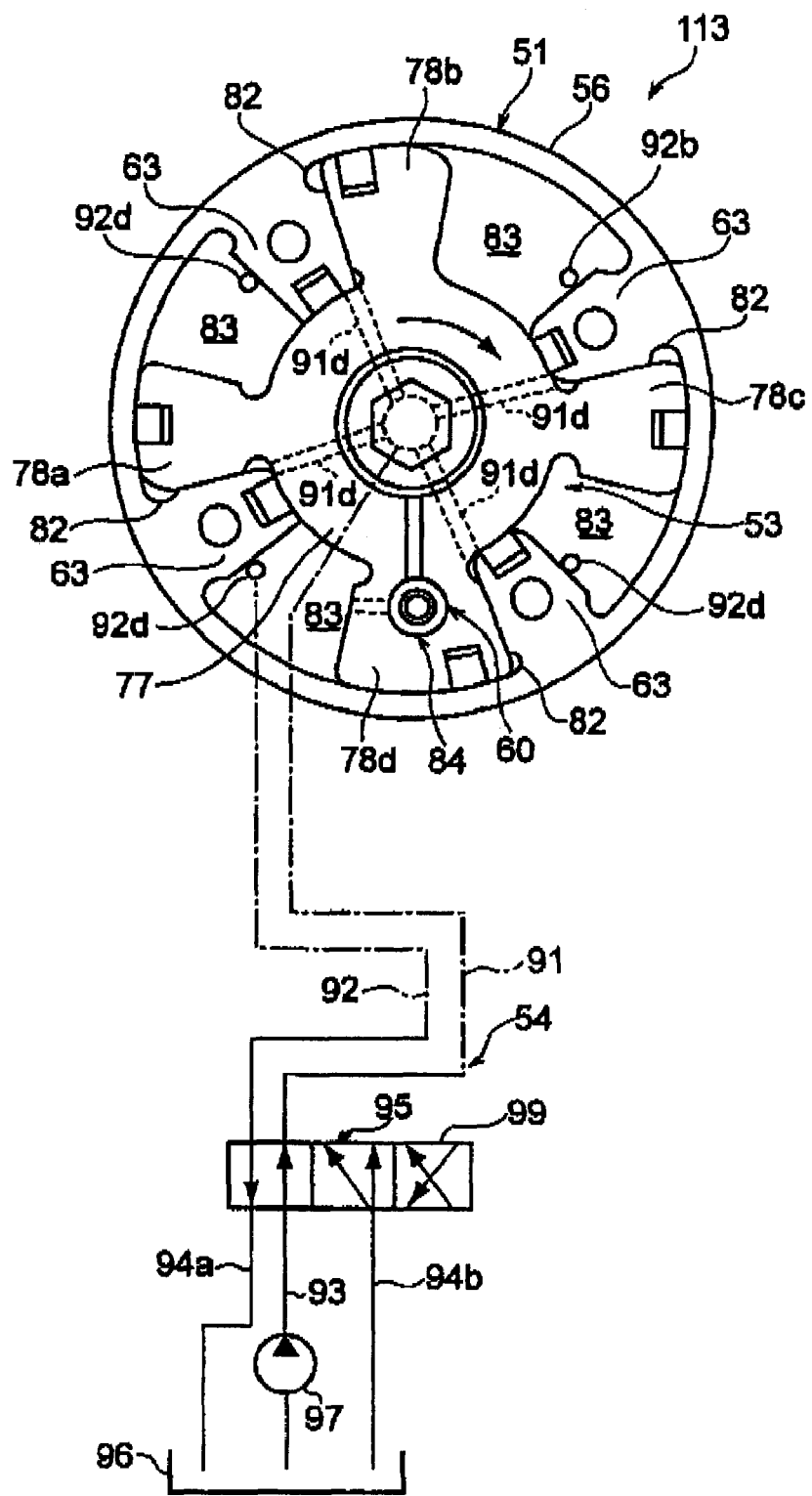
FIG. 4 is a diagram illustrating a variable valve timing mechanism for the intake valve according to the embodiment of the present invention.

FIG. 4 shows a structure of variable valve timing mechanism 113.

Variable valve timing mechanism 113 is provided with a cam sprocket 51 (a timing sprocket) which is rotatably driven by crankshaft 120 via a timing chain, a rotation member 53 secured to an end portion of intake side camshaft 3 and rotatably housed inside cam sprocket 51, a hydraulic circuit 64 which relatively rotates rotation member 53 with respect to cam sprocket 51, and a lock mechanism 60 which selectively locks a relative rotation position between cam sprocket 51 and rotation member 53 at predetermined positions.

Cam sprocket 61 is constituted by comprises: a rotation portion (not shown in the figure) having on an outer periphery thereof, teeth for engaging with the timing chain (or timing belt); a housing 66 located forward of the rotation portion, for rotatably housing rotation member 53; and a front cover and a rear cover (not shown in the figure) for closing front and rear openings of housing 56.

Housing 56 presents a cylindrical shape formed with both front and rear ends open and with four partition portions 63 provided to protrude inwardly at positions on the inner peripheral face at 90° in the circumferential direction, four partition portions 63 presenting a trapezoidal shape in transverse section and being respectively provided along the axial direction of housing 56.

Rotation member 53 is secured to a front end portion of intake side camshaft 3 and comprises an annular base portion 77 having four vanes 78a, 78b, 78c, and 78d provided on an outer peripheral face of base portion 77 at 90° in the circumferential direction.

First through fourth vanes 78a to 78d present respectively cross-sections of approximate trapezoidal shapes. The vanes are disposed in recess portions between each partition portion 63 so as to form spaces in the recess portions to the front and rear in the rotation direction. Advanced angle side hydraulic chambers 82 and retarded angle side hydraulic chambers 83 are thus formed.

Lock mechanism 60 has a construction such that a lock pin 84 is inserted into an engagement hole (not shown in the figure) at an initial position of rotation member 53.

Incidentally, the initial position of variable valve timing mechanism 113 is set at the most retarded angle position.

Hydraulic circuit 54 has a dual system oil pressure passage, namely a first oil pressure passage 91 for supplying and discharging oil pressure to advanced angle side hydraulic chambers 82, and a second oil pressure passage 92 for supplying and discharging oil pressure to retarded angle side hydraulic chambers 83. To these two oil pressure passages 91 and 92 are connected a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in a base 77 of rotation member 53, and connected to four branching paths 91d communicating with each advanced angle side hydraulic chamber 82. Second oil pressure passage 92 is connected to four oil galleries 92d opening to each retarded angle side hydraulic chamber 83.

In electromagnetic switching valve 95, an internal spool valve thereof is arranged so as to relatively control the switching between respective oil pressure passages 91 and 92, and supply passage 93 and drain passages 94a and 94b.

Engine control unit 114 controls the power supply quantity (controlled variable) for an electromagnetic actuator 99 which drives electromagnetic switching valve 95, based on a duty control signal superimposed with a dither signal.

In variable valve timing mechanism 113 which varies the phase of the center of the operating angle of intake valve 105, when a control signal of duty ratio 0% (OFF signal) is output to electromagnetic actuator 99, the hydraulic fluid pumped from oil pump 97 is supplied to retarded angle side hydraulic chambers 83 via second oil pressure passage 92, and the hydraulic fluid in advanced angle side hydraulic chambers 82 is discharged into oil pan 96 from first drain passage 94a via first oil pressure passage 91.

Consequently, an inner pressure of retarded angle side hydraulic chambers 83 becomes high while an inner pressure of advanced angle side hydraulic chambers 82 becomes low, and rotation member 53 is rotated to the most retarded angle side by means of vanes 78a to 78d. As a result, a valve-opening period (the center phase of the opening angle) of intake valve 105 is delayed.

On the other hand, when a control signal of duty ratio 100% (ON signal) is output to electromagnetic actuator 99, the hydraulic fluid is supplied to inside of advanced angle side hydraulic chambers 82 via first oil pressure passage 91, and the hydraulic fluid in retarded angle side hydraulic chambers 83 is discharged into oil pan 96 via second oil pressure passage 92 and second drain passage 94b, so that the inner pressure of retarded angle side hydraulic chambers 83 becomes a low pressure.

Therefore, rotation member 53 is rotated to the full to the advanced angle side by means of vanes 78a to 78d. As a result, the valve opening period (the center phase of the opening angle) of intake valve 105 is advanced.

The configuration of the variable valve timing mechanism is not limited to that shown in FIGS. 2 to 4, and other than the above-described vane type mechanism, there may be used a mechanism which relatively rotates intake side camshaft 3 to crankshaft 120 using gears, and the like. Further, there may be adopted a mechanism which uses, as the actuator, an electromagnetic brake other than the hydraulic actuator.

Engine control unit 114 computes a target rotating angle of control shaft 13, which is equivalent to target values of the operating angle of intake valve 106 and the lift amount thereof, based on engine operating conditions, to thereby feedback-control motor 17 so that an actual rotating angle of control shaft 13 detected by angle sensor 134 approaches the target rotating angle.

Further, engine control unit 114 each computes each target value of the center phase of operating angles of intake valve 105, based on the engine operating conditions, to thereby feedback-control the duty ratio of the control signal to be outputted to electromagnetic actuator 99 so that actual center phases detected by crank angle sensor 117 and cam sensor 132 approach the target values.

As described in the above, when electromagnetic actuator 99 is turned off, variable valve timing mechanism 113 is returned to the most retarded angle position. Therefore, the target of the center phase of the operating angle of intake valve 105 is set as an advanced angle amount from the most retarded angle position.

Figure 5:
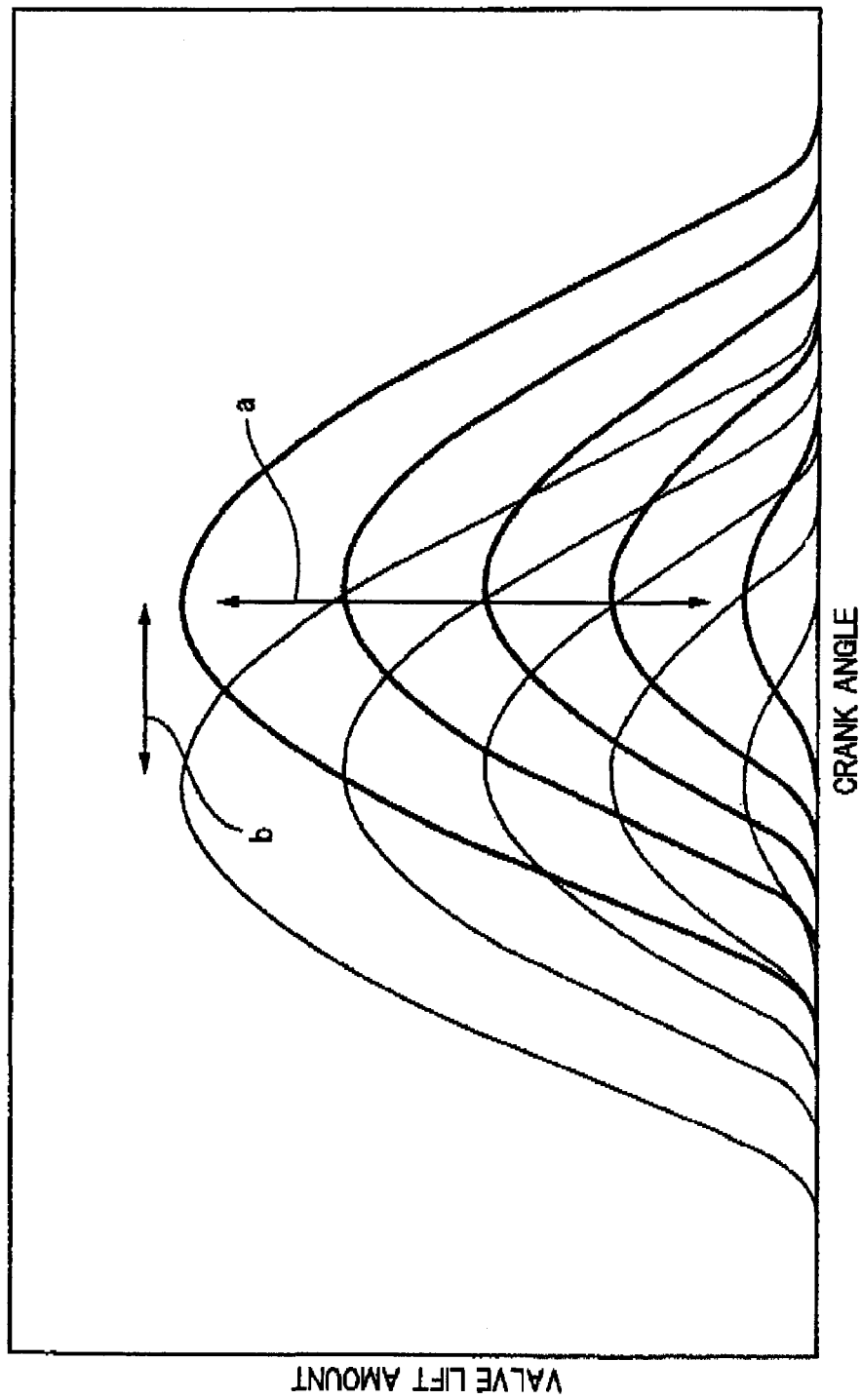
FIG. 5 is a graph illustrating change characteristics of a lift amount of the intake valve, an operating angle thereof and a center phase of the operating angle thereof according to the embodiment of the present invention.

FIG. 5 shows changes in opening characteristics of intake valve 6 by variable valve timing mechanism 113 and variable valve lift mechanism 112.

As shown in FIG. 5, when variable valve lift mechanism 112 is operated, both of the operating angle of intake valve 105 and the lift amount thereof are continuously increased or decreased, while holding the center phase of the operating angle of intake valve 106 approximately constant as shown by an arrow a.

On the other hand, when variable valve timing mechanism 113 is operated, the center phase of the operating angle of intake valve 105 is shifted to the advanced angle side or the retarded angle side, while holding the operating angle of intake valve 105 and the lift amount thereof approximately constant as shown by an arrow b.

As described above, it is possible to control with high precision the lift amount (the operating angle) of intake valve 105 and valve timing (the center phase of the operating angle) thereof by variable valve lift mechanism 112 and variable valve timing mechanism 113.

Further, by controlling the lift amount (the operating angle) of intake valve 105 and the valve timing (the center phase of the operating angle) thereof, and by controlling the fuel injection, the combustion of less unburned HC is performed while increasing an exhaust gas temperature rise effect, during a period of time from the starting of the engine operation to a time before the completion of engine warming-up (including cranking), so that the activity of exhaust gas purifying catalytic converters is accelerated while maintaining the excellent exhaust gas purification performance during this period of time. At this stage, the completion of engine warming-up may typically be determined when the cooling water temperature reaches a predetermined temperature, for example, 60° C.

Figure 6:
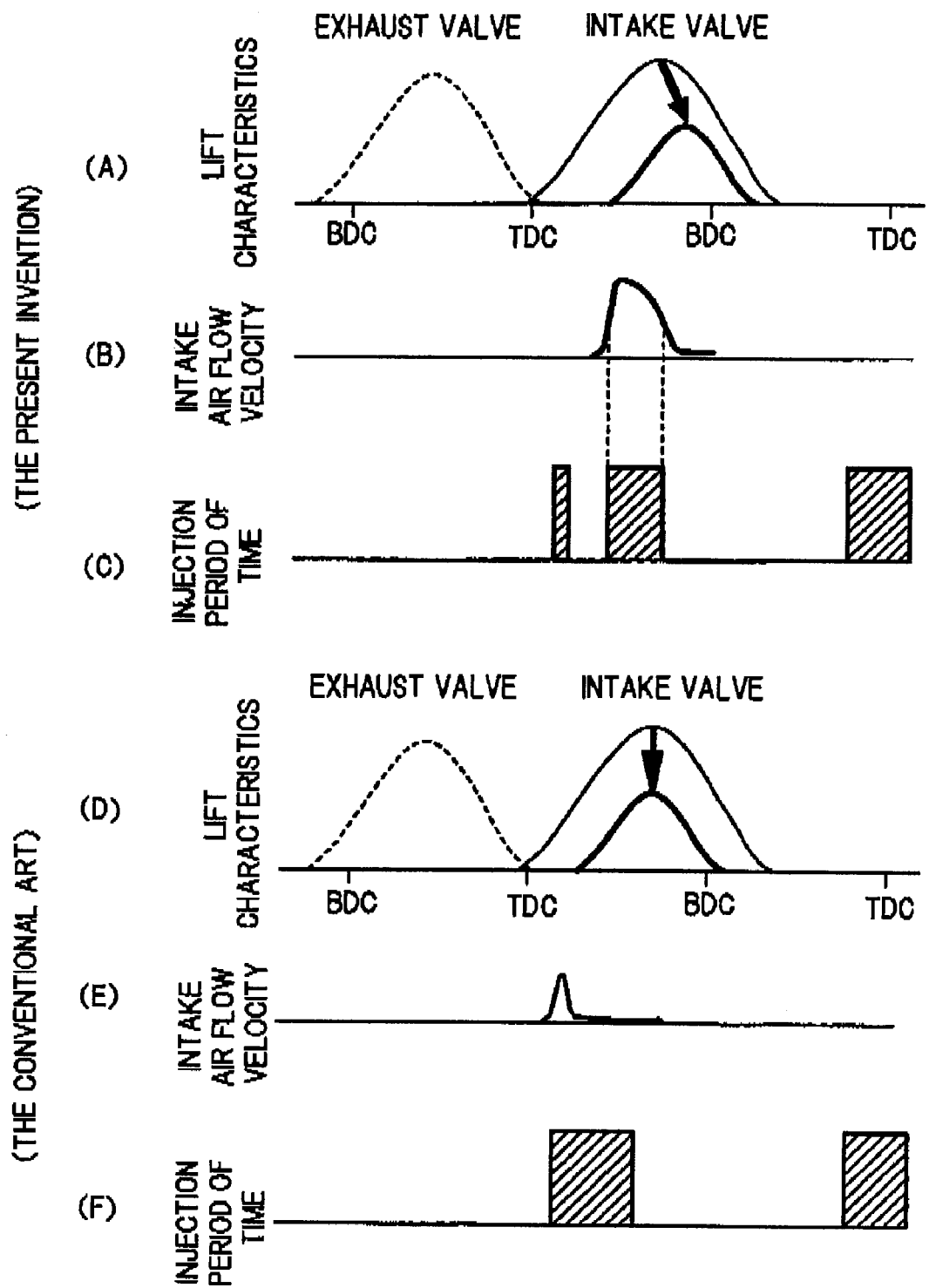
FIG. 6 is a diagram illustrating lift characteristics of the intake valve, intake air flow velocity and a fuel injection period according to the embodiment in comparison to those of a conventional art.

FIG. 6 shows lift characteristics of the intake valve, the flow velocity of intake air and fuel injection period according to a basic (simple) embodiment in comparison to those of a conventional art (in the figure, A to C corresponding to the present embodiment, and D to F corresponding to an example of the conventional art).

During a period of time from the starting of the engine operation to a time before the completion of engine warming-up, opening timing IVO of intake valve 105 is set at a value within a range from 30° to 140° after the top dead center of intake stroke by variable valve timing mechanism 113. Incidentally, in the case where closing timing EVC of the exhaust valve is controlled to be after the intake top dead center, if a retarded angle amount after the intake top dead center is large, and accordingly, it is impossible to neglect a delay in prevailing of negative pressure due to inletting of the exhaust gas from the exhaust valve, the opening timing IVO is set at a value within a range from a timing retarded by a predetermined crank angle from 30° to 140° after the top dead center of intake stroke.

Further, the lift amount of intake valve 105 is set at a value sufficiently smaller than the lift amount after the completion of engine warming-up by variable valve lift mechanism 112.

Thus, the opening timing IVO is fully retarded compared with the conventional art, so that intake valve 105 is opened in a state where the negative pressure in the combustion chamber is fully increased, and also, the lift amount (an effective opening area) is made smaller. Therefore, immediately after intake valve 105 is opened, the flow velocity of intake air flown into the combustion chamber via intake valve 105 is drastically increased, and also, a period of time in which the flow velocity is maintained high can be made sufficiently long.

More specifically, the flow velocity of intake air is determined based on a differential pressure or a pressure ratio between a combustion chamber pressure and a pressure on the upstream side of intake valve 105 (if the pressure on the upstream side of intake valve 105 is constant, the differential pressure or the pressure ratio is determined based on only the combustion chamber pressure), and the effective opening area of intake valve 105.

Here, the pressure prevailing in combustion chamber at the opening timing IVO of intake valve 105 takes a larger negative pressure as the opening timing IVO is retarded before the bottom dead center.

Conventionally, the valve opening timing IVO is set to be in an advanced angle side near the intake top dead center, so that the intake valve is opened when the negative pressure in the combustion chamber is not still increased, and therefore, the transient flow velocity of intake air immediately after the valve opening (the maximum flow velocity) is low.

Further, volumetric capacity in the combustion chamber immediately after the valve opening is small and also an increasing speed of the volumetric capacity in the combustion chamber is low since a piston speed is low. Therefore, a decreasing rate of the negative pressure in the combustion chamber in accordance with an air amount flown into the combustion chamber is high, and consequently, the flow velocity of intake air is greatly decreased in a short time and thus the period of time in which the flow velocity is high is extremely short.

On the other hand, in the present embodiment, as the configuration according to the present invention, since the valve opening timing IVO is set at the value within the range from 30° to 140° after the intake top dead center, the combustion chamber pressure at the valve opening timing IVO is the sufficiently large negative pressure, and accordingly, the transient flow velocity of intake air immediately after the valve opening (the maximum velocity) becomes sufficiently large.

Further, the valve opening timing IVO is set to be retarded from 30° after the intake top dead center, so that the volumetric capacity in the combustion chamber immediately after the valve opening is large, the decreasing rate of the negative pressure in the combustion chamber caused by the flowing amount of intake air into the combustion chamber is low, and also, the period of time in which the flow velocity of intake air is maintained high is significantly lengthened.

Further, the piston speed is reduced to the minimum at the top dead center and the bottom dead center, and the piston speed is increased to the maximum at a middle position apart from the top or bottom dead center. Since the opening timing IVO is set at a value within a range from timing retarded by a predetermined crank angle from 30° to 140° after the intake top dead center, the piston speed is high immediately after the valve opening, so that an increasing speed of the volumetric capacity in the combustion chamber is high. Therefore, the decreasing rate of the negative pressure in the combustion chamber caused by the flowing amount of intake air into the combustion chamber is lower, and consequently, the period of time in which the intake flow velocity of intake air is maintained high is further lengthened.

A description of a fuel injection control conducted according to the present invention will be provided hereinbelow.

As the most basic control, a first time injection is started immediately after intake valve 105 is opened, to be performed during the period of time in which the flow velocity of intake air is maintained high (to be referred to as high flow velocity period of intake air, hereunder). Thereafter, a second time injection is started at predetermined timing immediately before ignition timing. To be specific, the high flow velocity period of intake air may be defined in such a manner that it is started immediately after intake valve 105 is opened, and is a period of time in which the flow velocity of intake air is maintained larger than or equal to 100 m/s, for example. When the combustion chamber pressure and intake pipe pressure become approximately same value without satisfying the above-mentioned condition of the high flow velocity period of intake air, it is possible to define that the high flow velocity period of intake air ends.

Here, according to the present invention, during the period of time from the starting of the engine operation to a time before the completion of engine warming-up, the combustion is performed for increasing the exhaust gas temperature to accelerate the activation of the exhaust gas purifying catalytic converters. Therefore, the ignition timing is set to be in the retarded angle side in order to obtain the exhaust gas temperature rise effect due to after-burning. Accordingly, the second time fuel injection starting timing is set such that 20° before the ignition timing is an advanced angle side limit thereof.

Thus, the fuel injected at the first time during the period of time in which the flow velocity of intake air is high forms the homogeneous mixture in the whole combustion chamber while the atomization (evaporation) and mixture thereof being accelerated by a strong intake air flow, and the fuel injected at the second time immediately before the ignition timing forms the concentrated stratified mixture. Then, the stratified mixture is ignited to be combusted and the flame is propagated to the surrounding homogeneous mixture, so that the diffusing combustion is performed. Further, the exhaust gas temperature is increased due to the after-burning combustion after the expansion stroke, so that the activation of the exhaust gas purifying catalytic converters (front catalytic converter 108 and rear catalytic converter 109) is accelerated (that is, a time until the exhaust gas purifying catalytic converters are activated is shortened).

In particular, in comparison with the conventional art, the atomization (evaporation) of the fuel injected during the period of time in which the flow velocity of intake air is high is accelerated by the strong intake air flow. Further, when injected, the fuel is carried on the intake air flow to turn a direction thereof and is prevented from attaching a wall surface of the combustion chamber, so that the unburned HC is significantly reduced.

Here, the total fuel injection amount is determined based on the engine operating conditions (rotating speed, load, water temperature and the like). However, a rate of the first time injection amount to the second time injection amount may be easily divided into even rates.

Further, in the case where the main-combustion is the stratified combustion by the stratified air-fuel mixture which is formed around an ignition plug by the second time injection and the sub-combustion is the diffusing combustion by the homogeneous air-fuel mixture which is formed in the whole combustion chamber by the first time injection, the second time injection amount for the stratified combustion may be ensured up to a rich limit of the stratified combustion to set a deficiency of the injection amount as the first time injection amount for the diffusing combustion. However, the injection amount for the diffusing combustion is set to be equal to or larger than an injection amount equivalent to a lean limit at which the excellent diffusing combustion can be performed. On the contrary, even in the case where the main-combustion is the diffusing combustion and the sub-combustion is the stratified combustion, the fuel injection amount for the stratified combustion gets an injection amount equal to or larger than 10% of the total fuel injection amount to thereby ensure the excellent ignition.

In the case where a required injection amount cannot be covered by the above two times injection (the injection amount is deficient, even though the injection amount immediately before the ignition timing is made to be the rich limit to be injected during the period of time in which the flow velocity of intake air is high), a deficient fuel is injected before the period of time in which the flow velocity of intake air is high. This is because, after the lapse of the period of time in which the flow velocity of intake air is high, an evaporation acceleration effect due to the intake air flow cannot be obtained even if the fuel is injected, but if the fuel is injected before the period of time in which the flow velocity of intake air is high, the relatively excellent evaporation performance can be achieved by the increase at a certain degree of the negative pressure in the combustion chamber and also, the fuel evaporation effect can be obtained by the increase of the flow velocity of intake air after the fuel injection. Incidentally, the first injection and the injection during the period of time in which the flow velocity of intake air is high may be set to be continuously performed without separating them from each other (to be referred to as a first injection pattern).

Further, even in the case where the required injection amount can be covered by the two times injection, the first time fuel injection may be performed during a period of time previous to the period of time in which the flow velocity of intake air is high, and thereafter, the second time injection may be performed immediately before the ignition timing (to be referred to as a second injection pattern). For the fuel injected during the period of time previous to the period of time in which the flow velocity of intake air is high, although a part thereof is attached to the wall surface of the combustion chamber before the flow velocity of intake air is increased, it is injected in an early time and is exposed to the negative pressure in the combustion chamber to be evaporated at a certain degree, and thereafter, is further accelerated the evaporation thereof by the intake air flow. Therefore, the evaporation performance can be sufficiently enhanced.

Figure 7:
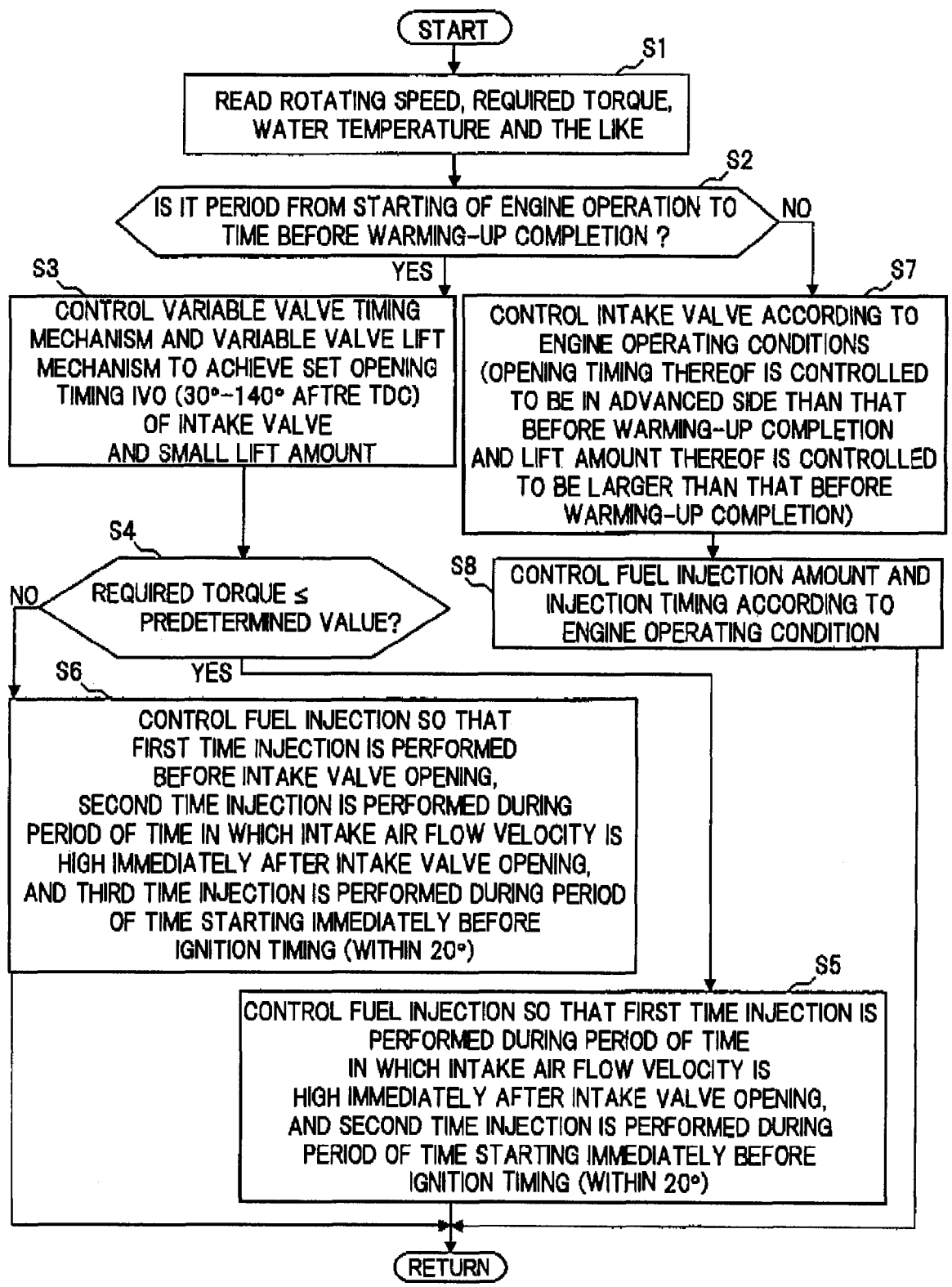
FIG. 7 is a flowchart of the controls according to the embodiment of the present invention.

FIG. 7 shows a flowchart of the controls of the valve timing of the intake valve and the lift amount thereof and the control of the fuel injection according to the basic embodiment (the first injection pattern).

In step S1, parameters necessary for the present controls, such as the engine rotating speed, required torque, the water temperature and the like, are read into the controlling section (e.g., ECU of FIG. 1), and thereafter, in step S2, it is determined whether or not it is the period of time before the warming-up completion from starting of the engine operation. This decision is executed in accordance with that the engine is rotated and the water temperature is equal to or lower than the predetermined temperature (for example, from 60° C. to 80° C.) and the like. Incidentally, the starting of the engine operation includes the cranking.

When it is determined that it is the period of time before the warming-up completion from starting of the engine operation, the control proceeds to step S3 where variable valve timing mechanism 113 and variable valve lift mechanism 112 are controlled so that the set opening timing IVO and the small lift amount are achieved.

Next, in step S4, it is determined whether or not the fuel injection amount equivalent to the required torque can be covered by the first time injection and the second time injection in accordance with whether or not the required torque is equal to or less than a predetermined value. Incidentally, since the injection possible periods (injection possible times) at the first and second times are shortened as the engine rotation speed becomes higher, the predetermined value may be set to be smaller according to an increase of the rotating speed.

When it is determined that the required torque is equal to or less than the predetermined value, in step S5, the fuel Injection is controlled to be performed at two times, that is, during the period of time in which the flow velocity of intake air is high and during a period of time starting immediately before the ignition timing.

When the required torque exceeds the predetermined value, in step S6, the first time injection is performed before the period of time in which the flow velocity of intake air is high, the second time injection is performed during the period of time in which the flow velocity of intake air is high, and a third time injection is performed during the period of time starting immediately before the ignition timing. Incidentally, as described above, the first time injection and the second time injection can be continuously performed.

When it is determined in step S2 that it is the period of time after the warming-up completion, in step S7, variable valve timing mechanism 113 and variable valve lift mechanism 112 are controlled so as to achieve the set valve timing of intake valve 105 and the set lift amount thereof which are set according to the engine operating conditions. Incidentally, the opening timing IVO of intake valve 105 is controlled to be in the advanced angle side compared with that before the warming-up completion, and the lift amount thereof is controlled to be larger than that before the warming-up completion.

In step S8, the fuel injection amount and the injection timing are normally controlled according to the engine operating conditions.

Hereunder, there will be described an application embodiment of the controls of the valve timing of intake valve and the lift amount thereof and the control of the fuel injection as described above.

Figure 8:
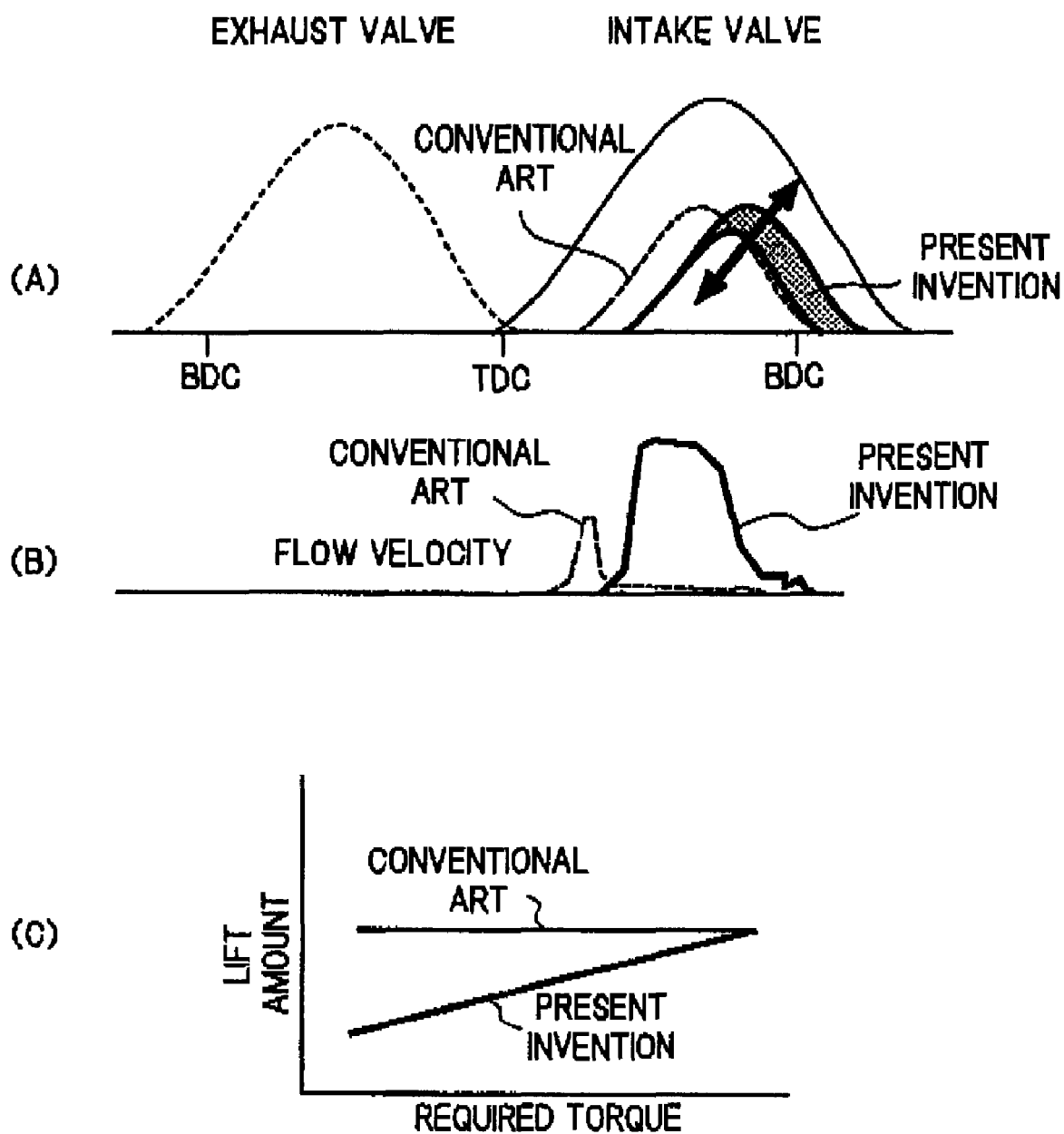
FIG. 8 is a diagram illustrating lift characteristics of the intake valve and the fuel injection period according to a second embodiment in comparison to those of a conventional art.

FIG. 8 shows lift characteristics of intake valve which is variably controlled corresponding to a change in load (required torque) during the period of time before the warming-up completion from starting of the engine operation, as a second application embodiment of the intake valve controlling.

To be specific, the above-mentioned lift characteristics of intake valve is that the lift amount is set at minimum when the required torque is at minimum while holding the opening timing IVO of intake valve constant irrespectively of the load change, and the lift amount is increased according to the increase of the required torque, and with this increase, closing timing IVC of intake valve is retarded.

Thus, by decreasing the lift amount as much as possible, it is possible to increase the flow velocity of intake air and also to extend the period of time in which the flow velocity of intake air is high as long as possible. Therefore, the atomization of the fuel can be further accelerated, and the unburned HC is further decreased by decreasing the fuel amount attached to the wall surface of the combustion chamber.

Even in the case where the opening timing IVO of intake valve and the lift amount thereof are controlled to be constant during the period of time from the starting of the engine operation to a time before the warming-up completion, by using in conjunction with an opening control of throttle valve, an intake air amount can be continuously varied according to the load (required torque) change.

Further, if the opening timing IVO is varied within the range from 30° to 140° after the intake top dead center, the average flow velocity of intake air is changed even though the lift amount (the effective opening area) is constant. Accordingly, by varying the opening timing IVO according to the load change within a range from the minimum average flow velocity of intake air to the maximum average flow velocity of intake air, it is also possible to continuously vary the intake air amount in proportion to "the average flow velocity of intake air×the effective opening area".

Figure 9:
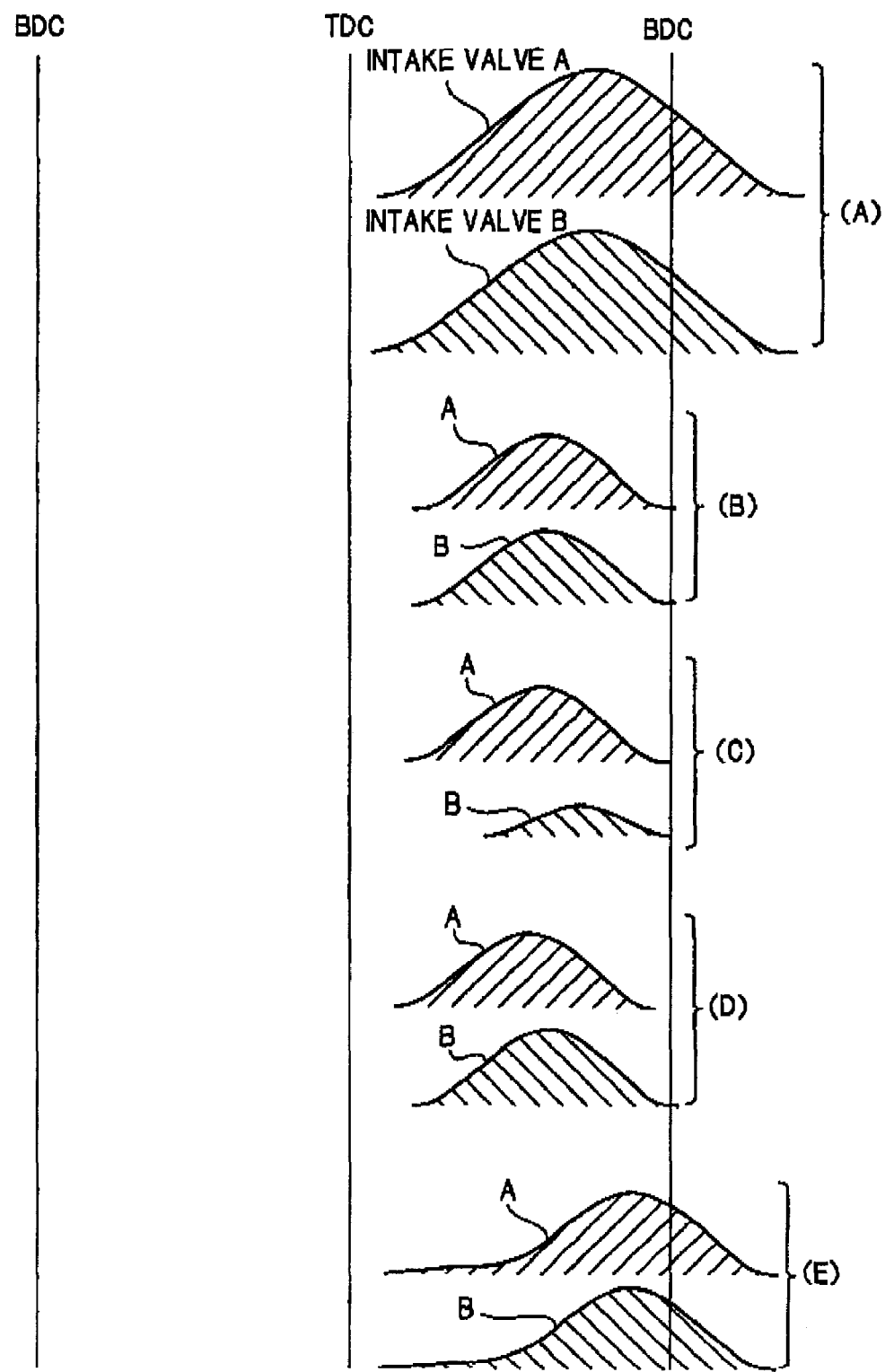
FIG. 9 is a diagram illustrating examples of various lift characteristics for the case where two intake valves are provided for one cylinder.

FIG. 9 shows various control examples for intake valve during the period of time from the starting of the engine operation to a time before the warming-up completion in (B) to (E), relative to standard lift characteristics of intake valves A and B after the warming-up completion shown in (A), in an internal combustion engine provided with a plurality (two) of intake valves A and B per one cylinder.

In (B), opening timing IVO of each of intake valves A and B is retarded by the same set angle from the intake top dead center TDC, while decreasing the lift amount of each of intake valves A and B by the same lift characteristics.

Further, in (C), although the lift amount of intake valve A is same as that in (B), the lift amount of intake valve B is made smaller and the opening timing thereof is further retarded. In (D), although the lift amount of intake valve B is same as that in (B), the valve timing (a phase of the center of the operating angle) thereof is retarded compared with that of intake valve A, so that the opening timing IVO of intake valve B and the closing timing IVC thereof are both retarded.

Further, in (E), the lift characteristics of intake valves A and B are made asymmetric to each other, so as to achieve the gradual start.

Thus, by combining characteristics of plural intake valves with each other, it is possible to easily meet the required fuel injection amount.

Further, the controls in (C) to (E) can be easily performed by using a mechanism which includes two cams and the like to switch in two stages the lift characteristics.

Figure 10:
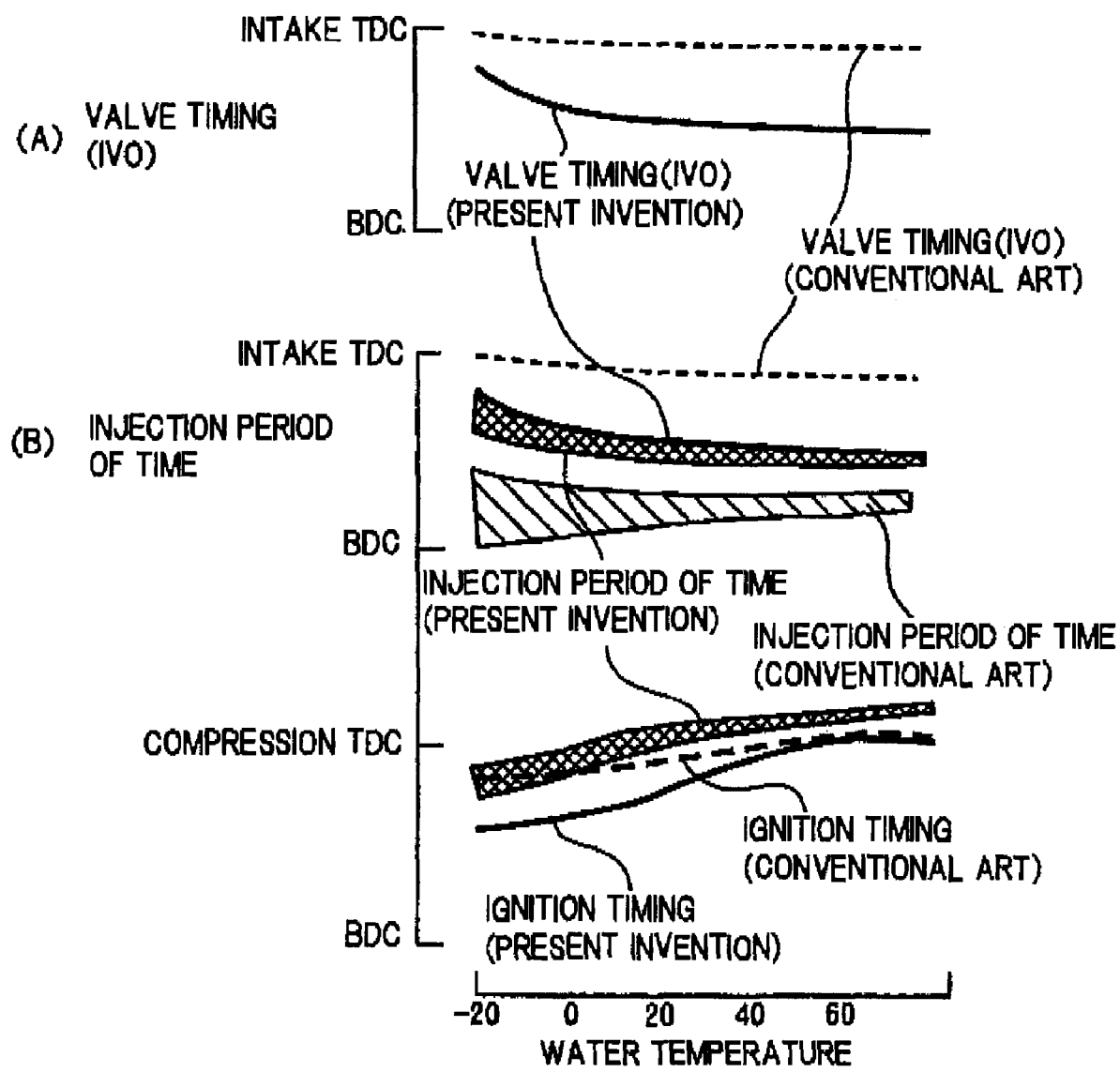
FIG. 10 is a diagram illustrating one embodiment of a controlling operation taken in the present invention, in which controls of the intake valve and the fuel injection are changed in accordance with the water temperature during a period of time from the starting of an engine operation to a time before the completion of engine warming-up.

FIG. 10 shows one embodiment of a controlling operation taken in the present invention, in which the controls of the intake valve and the fuel injection are changed in accordance with the water temperature during the period of time from starting of the engine operation to a time before the warming-up completion.

In this embodiment, the above described basic first injection pattern is applied. Namely, the first time fuel injection is performed during the period of time in which the flow velocity of intake air is high, and the second time fuel injection is performed during the period of time starting immediately before the ignition timing.

The present embodiment has a basic configuration same as that of the basic embodiment, in which the opening timing IVO of intake valve is retarded within the range from 30° to 140° after the intake top dead center during the period of time before the warming-up completion from starting the engine operation. However, in the present embodiment, the lift amount is made larger as the water temperature is lower. As a result, the retarded angle amount of the opening timing IVO is decreased, but is set within the above range, and therefore, the sufficient flow velocity of intake air is ensured.

There will be described the reason why the lift amount is made larger as the water temperature is lower.

As the retarded angle amount of the ignition timing is made larger, the combustion in the expansion stroke is retarded, so that the exhaust gas temperature rise effect is enhanced, but this results in low thermal efficiency (a heat quantity lost into the exhaust gas from heating value is increased), leading to the torque reduction.

Therefore, the lift amount is made larger to increase the air amount as the water temperature is lower at which the requirement for the exhaust gas temperature rise is large, and with the increase of the air amount, the injection period (injection amount) is also made larger to increase the occurred torque. Hence, it is possible that while satisfying the required torque by compensating for a torque component that is lost due to the exhaust gas temperature rise, the retarded angle amount of the ignition timing is further increased by taking into account the torque satisfaction to enhance the exhaust gas temperature rise effect, so that the early activation of the exhaust gas purifying catalytic converters is further accelerated.

Figure 11:
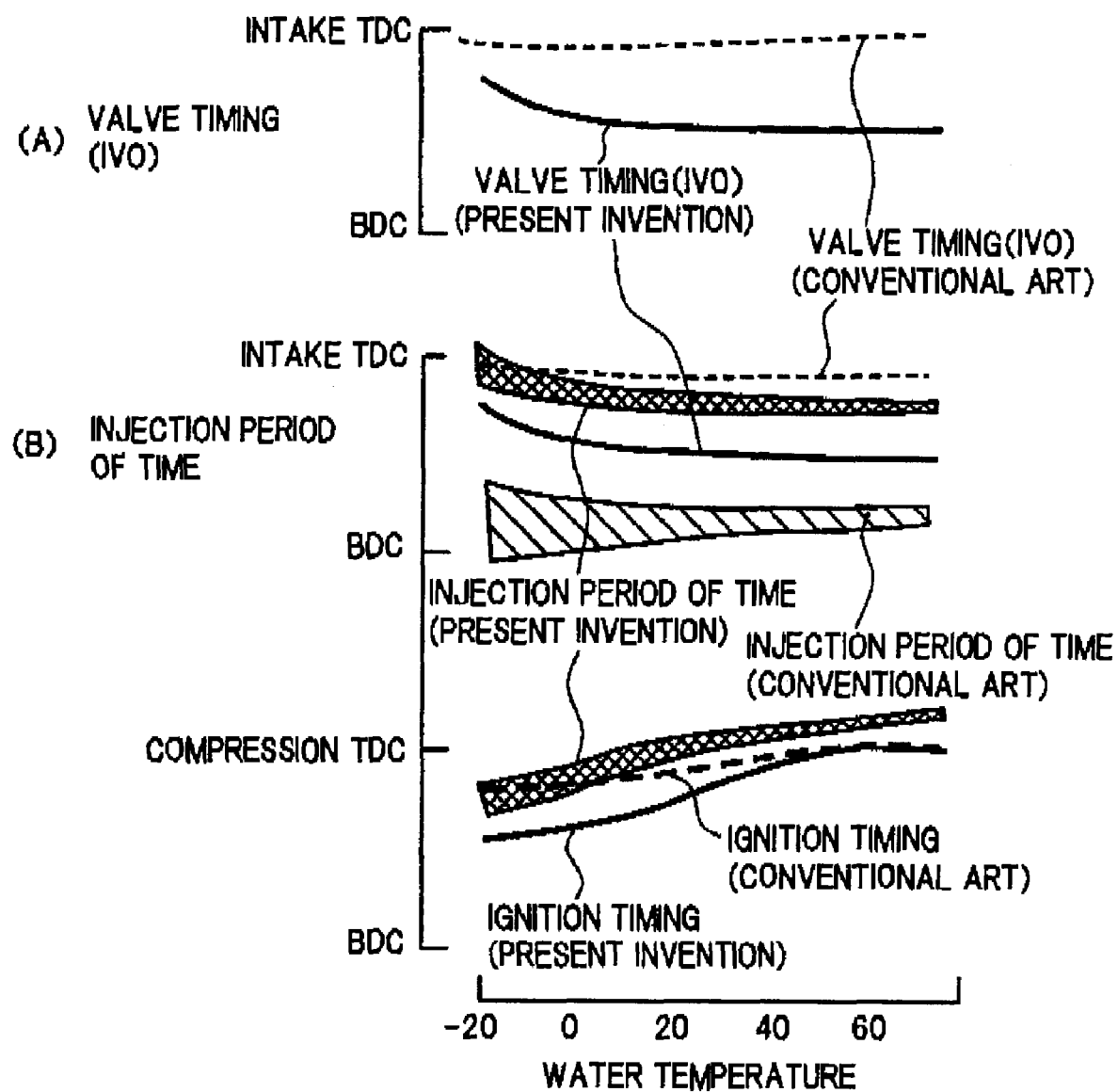
FIG. 11 is a diagram illustrating a slight modification of the embodiment of FIG. 10.

FIG. 11 shows a slight modification of the embodiment of FIG. 10 in which the controls of the intake valve and the fuel injection are changed in accordance with the water temperature during the period of time from starting of the engine operation to a time before the warming-up completion.

In this embodiment, the above described basic second injection pattern is applied. Namely, the first time fuel injection is performed before the period of time in which the flow velocity of intake air is high, and the second time fuel injection is performed during the period of time starting immediately before the ignition timing.

The configuration of the present embodiment other than the above is same as that of the embodiment shown in FIG. 10, and accordingly, an effect similar to that of the embodiment shown in FIG. 10 can be obtained.

Figure 12:
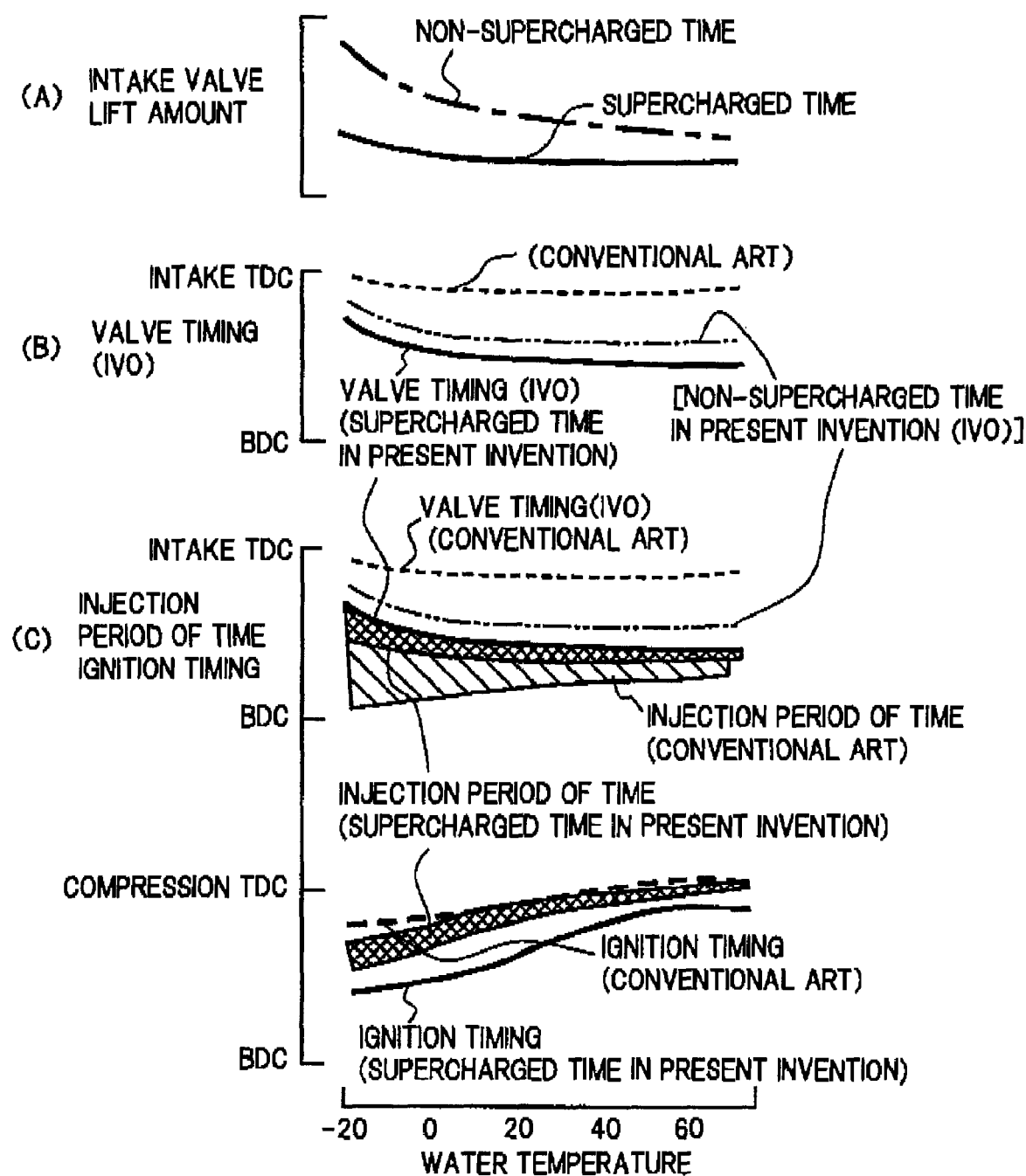
FIG. 12 is a diagram illustrating an embodiment for the case where the embodiment shown in FIG. 10 is applied to an engine with supercharger.

FIG. 12 shows an embodiment for the case where the embodiment shown in FIG. 10 is applied to an engine with supercharger.

The controls of intake valve and the fuel injection are switched between a supercharged region by the supercharger (a solid line in the figure) and a non-supercharged region (a dashed-dotted line in the figure), during a period of time from starting of the engine operation to a time before the completion of engine warming-up.

To be specific, in the supercharged region, since a charging pressure (an intake valve upstream pressure) is high, the lift amount for obtaining the required air amount can be made smaller than that in the non-supercharged region, and also, the opening timing IVO can be further retarded. As a result, the flow velocity of intake air immediately after the intake valve opening can be further increased. Accordingly, it is possible to further accelerate the atomization of injected fuel, and further, the exhaust gas temperature rise and the activation of the exhaust gas purifying catalytic converters. Incidentally, the controls of the intake valve and the fuel injection in the non-supercharged region are performed similarly to those in FIG. 11.

Figure 13:
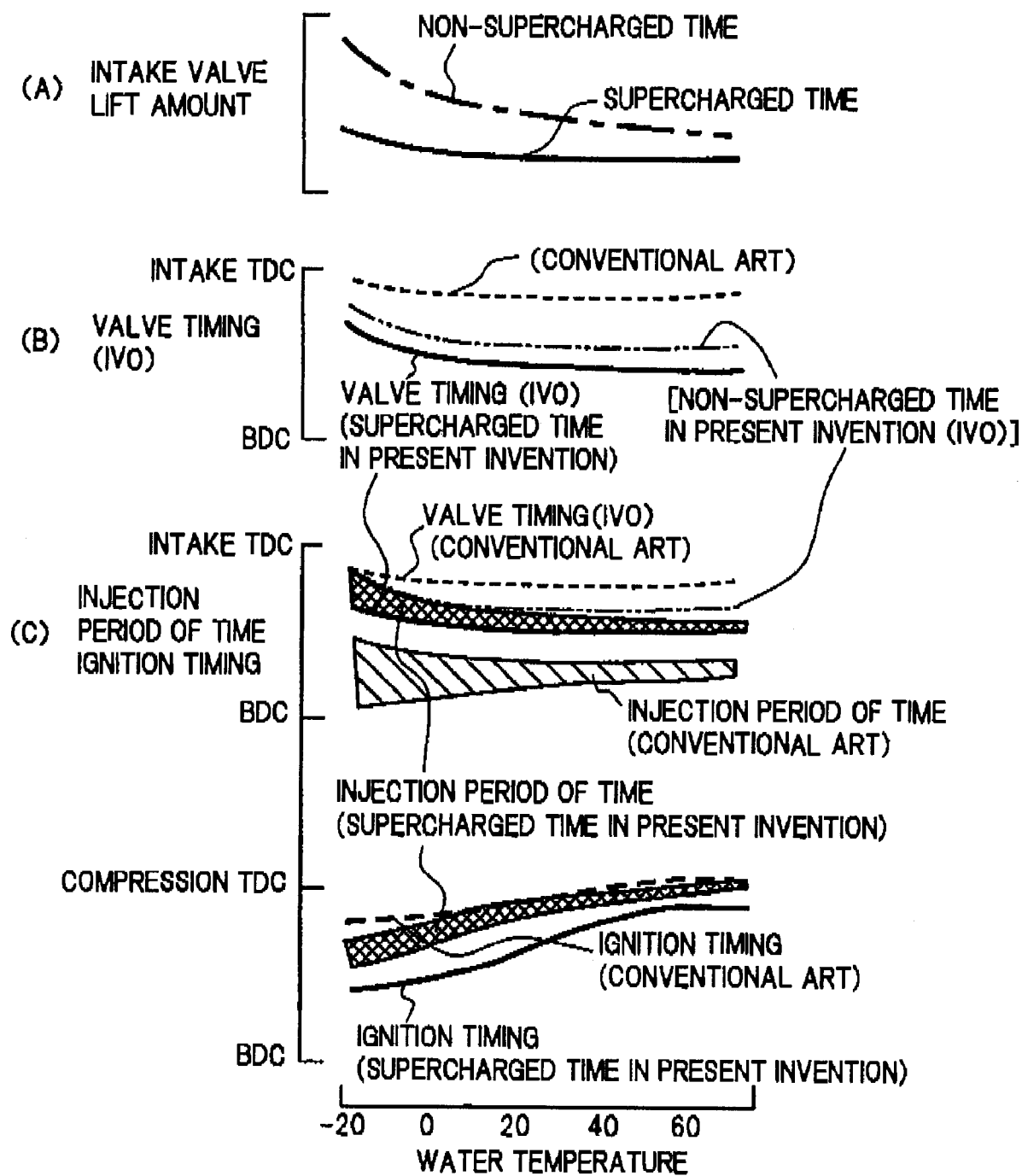
FIG. 13 is a diagram illustrating an embodiment for the case where the embodiment shown in FIG. 11 is applied to the engine with supercharger.

FIG. 13 shows an embodiment in which the embodiment shown in FIG. 11 (the first time fuel injection is performed before the period of time in which the flow velocity of intake air is high and the second time fuel injection is performed during the period of time starting immediately before the ignition timing) is applied to the engine with supercharger.

The controls other than the first time fuel injection control are same as those in the embodiment shown in FIG. 12, and accordingly, an effect similar to that of the embodiment shown in FIG. 12 can be obtained.

The entire contents of Japanese Patent Application No. 2007-032498 filed on Feb. 13, 2007 a priority of which is claimed, are incorporated herein by reference.

While only selected embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

We claim:

1. An apparatus for controlling an intake operation of an internal combustion engine, comprising:
    a fuel injection valve configured to directly inject fuel into a combustion chamber;
    a first variable valve mechanism configured to continuously vary an effective opening area of an intake valve;
    a second variable valve mechanism configured to vary a center phase of an operating angle of the intake valve;
    a variable valve mechanism controlling section that controls the first and second variable valve mechanisms for allowing the intake valve to have opening timing of a value within a predetermined range from 30° to 140° after top dead center of intake stroke during a period of time from starting of an engine operation to a time prior to completion of engine warming-up, and also, for allowing the intake valve to exhibit a predetermined effective opening area, which is smaller than the effective opening area thereof after the completion of engine warming-up, to thereby increase a flow velocity of intake air entering through the intake valve; and
    a fuel injection controlling section that controls the fuel injection valve to perform the fuel injection during at least one of a period of time in which the flow velocity of intake air is high immediately after the intake valve is opened and another period of time previous to the period of time in which the flow velocity of intake air is high, and during a further period of time starting immediately before ignition timing.

2. The apparatus according to claim 1, wherein the variable valve mechanism controlling section controls the effective opening area to be increased according to an increase of required intake air amount under a condition that the opening timing of the intake valve is maintained at the set value, during the period of time from the starting of the engine operation to a time before the completion of engine warming-up.

3. The apparatus according to claim 1, wherein the variable valve mechanism controlling section controls closing timing of the intake valve at a value within a range from timing retarded by a predetermined crank angle from 30° to 140° after the top dead center of intake stroke, when closing timing of an exhaust valve is set after the top dead center of intake stroke.

4. The apparatus according to claim 1, wherein the fuel injection controlling section controls the fuel injection during the period of time starting immediately before the ignition timing to be started after 20° before the ignition timing.

5. The apparatus according to claim 1, wherein, in the fuel injection during the period of time in which the flow velocity of intake air is high and during the period of time starting immediately before the ignition timing, when a fuel injection amount is smaller than a required value, the fuel injection controlling section controls the fuel injection so that fuel corresponding to a deficient fuel amount is injected before a period of time in which the flow velocity of intake air is increased.

6. The apparatus according to claim 1, further comprising:
    an engine temperature detecting section that detects an engine temperature; and an ignition timing control section that controls an ignition timing,
    wherein the variable valve mechanism controlling section controls the effective opening area of the intake valve to be increased as the engine temperature detected by an engine temperature detecting section is lower, and
    the ignition timing controlling section controls a retarded angle amount of the ignition timing to be increased as the engine temperature detected by the engine temperature detection section is lower.

7. The apparatus according to claim 1, wherein the internal combustion engine is provided with a supercharger, and
the variable valve mechanism controlling section controls, in a supercharged region, the intake valve to exhibit a lift amount thereof, which is larger and/or to exhibit a retarded angle amount of the opening timing thereof, which is larger than those exhibited in a non-supercharged region.

8. The apparatus according to claim 1, wherein the internal combustion engine is provided with a plurality of intake valves per one cylinder, and
the variable valve mechanism controlling section controls the opening timing of each intake valve to become the predetermined range and also controls the effective opening area thereof to become the predetermined effective opening area thereof by combining lift characteristics of the plurality of intake valves.

9. An apparatus for controlling an intake operation of an internal combustion engine, comprising:
a fuel injection valve configured to directly inject fuel into a combustion chamber;
a first variable valve mechanism configured to continuously vary an effective opening area of an intake valve;
a second variable valve mechanism configured to vary a center phase of an operating angle of the intake valve;
variable valve mechanism controlling means for controlling the first and second variable valve mechanisms, for allowing the intake valve to have opening timing thereof of a value within a predetermined range from 30° to 140° after the intake top dead center during a period of time from starting of an engine operation to a time before completion of engine warming-up, and also, for allowing the intake valve to exhibit a predetermined effective opening area, which is smaller than the effective opening area thereof after the completion of engine warming-up to thereby increase a flow velocity of intake air entering through the intake valve; and
fuel injection controlling means for controlling the fuel injection valve to perform the fuel injection during at least one of a period of time in which the flow velocity of intake air is high immediately after the intake valve is opened and a period of time previous to the period of time in which the flow velocity of intake air is high, and during a period of time starting immediately before ignition timing.

10. A method of controlling an intake operation of an internal combustion engine including a fuel injection valve configured to directly inject fuel into a combustion chamber, a first variable valve mechanism configured to continuously vary an effective opening area of an intake valve, and a second variable valve mechanism configured to vary a center phase of an operating angle of the intake valve, comprising the steps of:
controlling the first and second variable valve mechanisms for allowing the intake valve to have opening timing thereof of a value within a predetermined range from 30° to 140° after an intake top dead center during a period of time from starting of an engine operation to a time before completion of engine warming-up, and also, for allowing the intake valve to exhibit the effective opening area, which is smaller than the effective opening area thereof after the completion of engine warming-up to thereby increase the flow velocity of intake air entering through the intake valve; and
controlling the fuel injection valve to perform the fuel injection during at least one of a period of time in which the flow velocity of intake air is high immediately after the intake valve is opened and another period of time previous to the period of time in which the flow velocity of intake air is high, and during a period of time starting immediately before ignition timing.

11. The method according to claim 10, wherein the step of controlling the variable valve mechanisms controls the effective opening area to be increased according to an increase of required intake air amount under a condition that the opening timing of the intake valve is maintained at the set value, during the period of time from the starting of the engine operation to a time before the completion of engine warming-up.

12. The method according to claim 10, wherein the step of controlling the variable valve mechanisms controls closing timing of the intake valve at a value within a range from timing retarded by a predetermined crank angle from 30° to 140° after the intake top dead center, when closing timing of an exhaust valve is set after the intake top dead center.

13. The method according to claim 10, wherein the step of controlling the fuel injection controls the fuel injection during the period of time starting immediately before the ignition timing to be started after 20° before the ignition timing.

14. The method according to claim 10, wherein, in the fuel injection during the period of time in which the flow velocity of intake air is high and during the period of time starting immediately before the ignition timing, when a fuel injection amount is smaller than a required value, the step of controlling the fuel injection controls the fuel injection so that fuel corresponding to a deficient fuel amount is injected before a period of time in which the flow velocity of intake air is increased.

15. The method according to claim 10, further comprising the steps of:
detecting the engine temperature; and controlling the ignition timing,
wherein the step of controlling the variable valve mechanisms controls the effective opening area of the intake valve to be increased as the detected engine temperature is lower, and
the step of controlling the ignition timing controls a retarded angle amount of the ignition timing to be increased as the detected engine temperature is lower.

16. The method according to claim 10, wherein the internal combustion engine is provided with a supercharger, and
the step of controlling the variable valve mechanisms controls, in a supercharged region, a lift amount of the intake valve to be larger and/or a retarded angle amount of the opening timing of the intake valve to become larger than those in a non-supercharged region.

17. The method according to claim 10, wherein the internal combustion engine is provided with a plurality of intake valves per one cylinder, and
the step of controlling the variable valve mechanisms controls the opening timing of each intake valve to become the predetermined range and also controls the effective opening area thereof to become the predetermined effective opening area thereof by combining lift characteristics of the plurality of intake valves.

* * * * *